United States Patent [19]

Timmer

[11] 4,068,343
[45] Jan. 17, 1978

[54] CASTOR FORK ASSEMBLY WITH PROTECTIVE SURFACE

[75] Inventor: Hendrikus Jacobus Maria Timmer, Tiel, Netherlands

[73] Assignee: SKF Industrial Trading and Development Company B.V., Nieuwegein, Netherlands

[21] Appl. No.: 695,422

[22] Filed: June 14, 1976

[30] Foreign Application Priority Data

June 26, 1975 Netherlands .................... 7507593

[51] Int. Cl.² ............................................ B60B 33/00
[52] U.S. Cl. .................... 16/31 R; 16/31 A; 85/1 JP
[58] Field of Search ............... 16/31 R, 31 A, 18 R; 277/166, 235 B; 52/549; 403/23, 286; 85/1 JP

[56] References Cited

U.S. PATENT DOCUMENTS

| Re. 27,085 | 3/1971 | Weidner, Jr. | 85/1 JP |
|---|---|---|---|
| 2,654,112 | 10/1953 | Milhizer | 16/31 R X |
| 2,697,873 | 12/1954 | Cooke, Jr. | 85/1 JP |
| 2,885,821 | 5/1959 | Frick | 16/21 |
| 3,300,929 | 1/1967 | Fischer | 52/549 X |
| 3,399,421 | 9/1968 | Crawford | 16/26 |
| 3,461,480 | 8/1969 | Sheahan | 16/18 R |
| 3,566,738 | 3/1971 | Cupit | 85/1 JP |

FOREIGN PATENT DOCUMENTS 1,322,099  2/1963  France .............................. 16/18 A

*Primary Examiner*—Werner H. Schroeder
*Assistant Examiner*—Conrad L. Berman
*Attorney, Agent, or Firm*—Daniel M. Rosen

[57] ABSTRACT

A castor wheel having a fork at which upper part a rolling bearing is applied and being provided with a support means or support plate to which by bolt fastening a load or carriage can be connected, the support means being provided with a relatively thin, slightly deformable layer having projections which fit around the support means wherein the layer has projections which fit through bolt openings of the support means by means of a rim-part which resiliently fits over the edge of a bolt opening.

9 Claims, 1 Drawing Figure

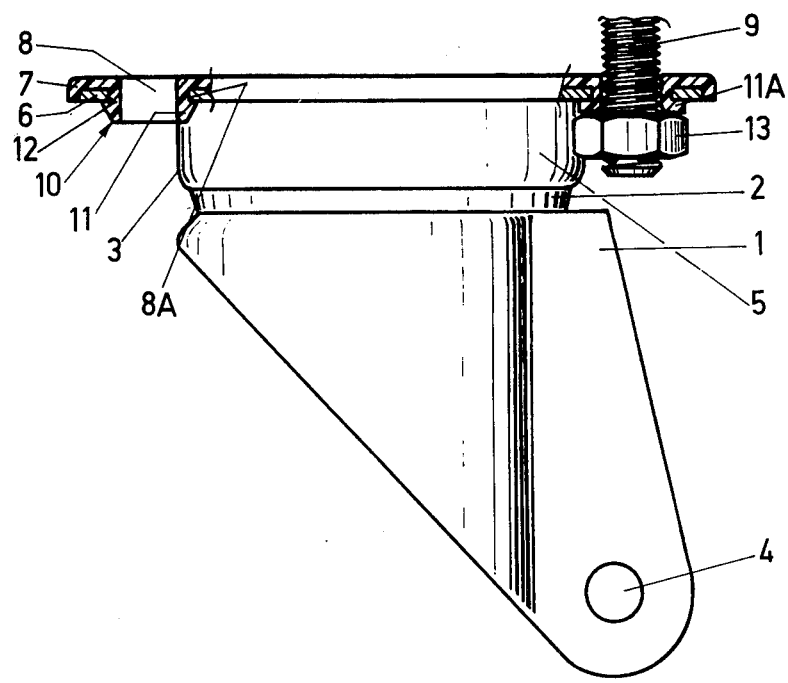

CASTOR FORK ASSEMBLY WITH PROTECTIVE SURFACE

The invention relates to a castor wheel comprising a fork having a rolling bearing mounted on its upper end and being provided with a support means or support plate to which a load or carriage can be connected by bolts, Such a castor wheel is e.g. disclosed in the French patent specification No. 2.164.575. This type of wheel construction is mainly used to enable and facilitate a load, such as e.g. a magazine carriage, to be movable in various directions. Under such carriage castor wheels are mounted usually by connecting a support means such as a support plate to the underside of the carriage by means of bolt joints. With the castor wheels of the type described the disadvantage is noticeable that - after a period of time - oxidation has occurred between the plate and the carriage. This phenomenon is caused by the fact that moisture has penetrated between the underside of the carriage and the support means or plate and has caused corrosion in the surfaces of the plate and the contact area of the carriage with said plate. Oxidation is also facilitated by minor damage to the surface of the plate caused by vibrations and friction phenomena occurring between plate and carriage. Although this kind of damage does not directly affect the mechanical load capacity of the wheel construction, it however accelerates corrosion - in particular when the driving carriage is used in damp surroundings - as a result of which dangerous fractures may indeed occur in the castor wheel construction.

The invention presents a castor wheel of the said type according to which the above-mentioned difficulties have been overcome. To this effect a relatively thin slightly deformable layer is provided on top of the support means, the layer having projections which fit around the support means. layer also comprises projections which fit through bolt openings of the support means by means of a rim-part which resiliently fits over the edge of a bolt opening. In this manner the following advantages are achieved:

Firstly by such developed projections simple mounting of the layer to the plate can be realised;

Secondly a part of said projection can now be employed as a retaining means for the bolt fastening, i.e. the use of separate retaining rings of safety rings is unnecessary; whilst at the same time penetration of moisture via the bolt shaft to the plate edge is prevented. Apart from the advantage produced by the fact that the application of extra retaining or safety rings is no longer necessary, by this measure loss of such rings during storage or transportation is now quite impossible.

According to one embodiment of the invention said projection comprises a weakened part which, during tightening of a boltnut, is elastically deformed adjacent the underside of said support means or plate.

According to a favourable embodiment of the invention said layer consists of a slightly deformable mainly feat material and provided with projections that can be fitted through bolt openings and having a circumferential bent rim which fits around said support means or plate. Due to this construction no corrosion can occur between the support means or support plate and the underside of the carriage, because penetration of moisture as well as the occurrence of damage between plate and carriage cannot readily occur.

The invention and how it can be constructed are hereinafter particularly described with reference to the single accompanying drawing, which shows a part of a castor wheel, partly in cross-section, in accordance with the invention.

The figure shows partly in sectional view a castor wheel having a castor wheel fork 1, and rolling bearing 2, 3 is connected to the top of fork 1. The bottom of the castor-wheel fork is provided with an opening 4 for mounting a shaft of a castor wheel, not shown. Outer-ring 5 of bearing 3 is connected to a plate 6, alternatively the race ring and support plate may be manufactured from the same material, for example plate steel. Preferably, the castor wheel fork 1 and inner ring 2 as well as the support plate 6 and outer ring 5 are manufactured by means of a forging or spray casting method. Bearing 3 can be any suitable type of rolling bearing or sliding bearing. Essential according to the invention, however, is the provision of layer 7 for support plate 6. Layer 7 — preferably manufactured from a slightly elastically deformable plastic material — is fitted over plate 6 and provided with hollow projections 10 which extend through bolt openings 8. Mounting of projection 10 is achieved by its rim 11 which "snaps" around opening 8; this means that annular notch 12 of the projection 10 fits around the rim or edge 8A of opening 8. Preferably layer 7 and projection 10 are a unitary number made of a slightly elastically deformable material, so that proper clamping between plate 6 and projection 10 can be achieved without layer 7 becoming loose under the influence of outside forces or loads. It is advantageous that rim 11, when it is pressed in or alternatively when nut 13 is tightened, is moved sideways or mainly in radial direction. This situation is indicated on the right-hand side of the figure, which part shows that after tightening nut 13, the elastically deformable rim part 11a is deformed sideways or pressed adjacent to the support plate 6 and according to the invention forms a retaining means against unintentional loosening of nut 13 threaded onto bolt 9.

A castor wheel construction is thereby provided whereby as a result of the specific construction of said layer 7, penetration of moisture and the like in places undesirable for the construction is prevented, whereas at the same time the bolt fastening by the absence of separate retaining rings is simplified.

What is claimed is:

1. In a castor wheel assembly having a fork, a rolling bearing mounted to the top of the fork, said assembly having a support plate with bolt holes mounted to the top of said rolling bearing, whereby a load or carriage can be connected to one side of said support plate by bolts extending through said bolt holes, the improvement comprising a layer of relatively thin slightly deformable material on said one side of said support plate, said layer having hollow projections of said material extending through said bolt holes, said projections having rims of said material which resiliently engage the side of said support plate opposite said one side thereof and adjacent said holes.

2. The castor wheel assembly of claim 1, wherein said castor wheel assembly is held to said load or carriage by bolt nuts on bolts extending through said projections, said rims forming retaining means for said bolt nuts.

3. The castor wheel assembly of claim 1, wherein said assembly is held to a load or carriage by bolt nuts on bolts extending through said holes, said rims of said projections comprising safety rings for said bolt nuts.

4. The castor wheel assembly of claim 1, wherein said projections comprise weakened portions, whereby bolt nuts holding said support plate to a load or carriage elastically deform said projections adjacent said opposite side of said support plate upon tightening of said bolt nut.

5. The castor wheel assembly of claim 1, wherein said layer further has a circumferentially bent rim which fits around said support plate.

6. In a castor wheel assembly comprising a support plate with a mounting surface, a rolling bearing on said support plate opposite said mounting surface, a castor wheel fork supported on said rolling bearing for rotation relative to said plate, and a plurality of bolt holes in said support plate for mounting said castor wheel assembly to a load or carriage, the improvement comprising a layer of a thin deformable unitary material covering said mounting surface and having hollow projections of said material extending through said bolt holes, the ends of said projections having rims of said material which engage said support plate adjacent said bolt holes on the side thereof opposite said mounting surface, whereby mounting bolts for mounting said castor wheel assembly to said load or carriage extend through said hollow projections and engage said rims.

7. The castor wheel assembly of claim 6, wherein said layer is of a plastic material.

8. The castor wheel assembly of claim 6, wherein said projections have annular grooves into which said mounting plate adjacent said holes fit, whereby said layer is resiliently held to said mounting plate.

9. The castor wheel assembly of claim 6, wherein said layer further has a circumferentially bent rim which engages the edges of said support plate.

* * * * *

UNITED STATES PATENT AND TRADEMARK OFFICE
CERTIFICATE OF CORRECTION

PATENT NO. : 4,068,343
DATED : January 17, 1978
INVENTOR(S) : Hendrikus J.M. Timmer It is certified that error appears in the above-identified patent and that said Letters Patent are hereby corrected as shown below:

Column 1, line 39 after "means." insert --The--.

Column 1, line 63 change "feat" to --flat--.

Signed and Sealed this

Sixteenth Day of May 1978

[SEAL]

Attest:

RUTH C. MASON
Attesting Officer

LUTRELLE F. PARKER
Acting Commissioner of Patents and Trademarks